Feb. 9, 1932.          H. A. ANDERSON          1,844,551
SAFETY GAS COCK
Filed Oct. 1, 1930
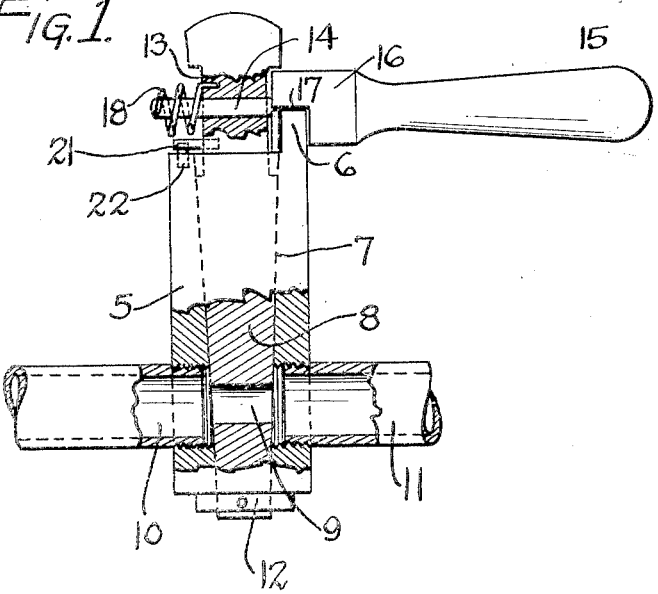
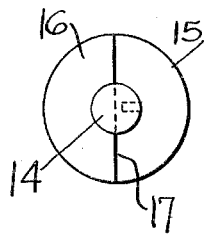
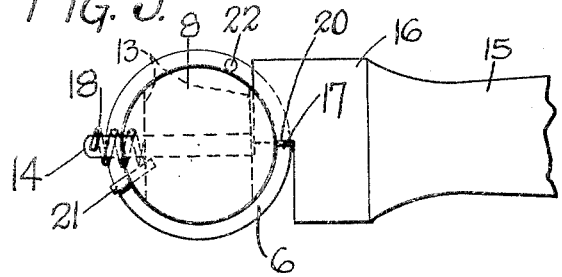
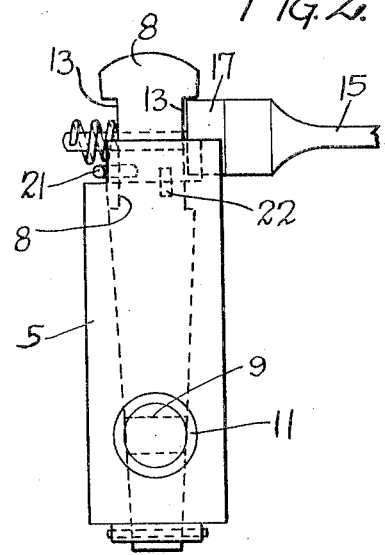
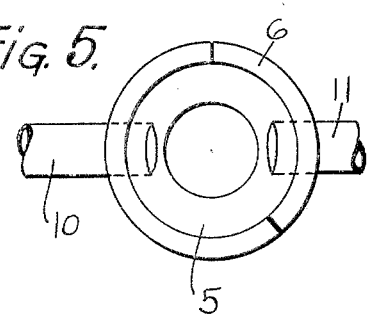
Inventor
HERMAN A. ANDERSON
By His Attorney Patented Feb. 9, 1932

1,844,551

UNITED STATES PATENT OFFICE

HERMAN A. ANDERSON, OF ELMHURST, NEW YORK

SAFETY GAS COCK

Application filed October 1, 1930. Serial No. 485,597.

This invention relates to a gas cock or valve of the self-locking or safety type.

A particular object of my invention is to provide a gas cock or valve which, when turned to cut off the flow of gas, will automatically lock itself so that the gas cannot be accidentally turned on without an initial revolving movement of the gas cock handle in order to bring the same into position so that the gas may be turned on.

A still further object of my invention is to provide a gas valve which may be incorporated in the present type of gas stove construction without appreciably altering the parts thereof and one which may be made up at small cost and will prevent tampering with the gas stove by children or the accidental turning on of the gas or the incomplete turning off of the gas so that a very small amount is left escaping, which is unnoticed at the time that the gas is turned off.

With these and other objects in view, my invention comprises the construction, combination and arrangement of the various parts hereinafter described, and then particularly pointed out in the appended claims.

In the drawings:

Figure 1 is a view in elevation of a gas valve constructed in accordance with my invention, parts being illustrated in section to show the construction.

Figure 2 is a view taken at right angles to the showing in Figure 1 with the handle turned to the "off" position.

Figure 3 is an enlarged top plan of the valve as illustrated in Figure 2.

Figure 4 is a view in end elevation of the handle, and

Figure 5 is a top plan view of the valve sleeve, the valve body and handle being removed therefrom.

Referring to the drawings in detail, 5 indicates the valve body or sleeve of my improved gas cock construction, the upper edge thereof being cut to provide an arcuate extension 6 constituting a slide seat for the cutout portions of a handle. The valve sleeve 5 is provided with a tapered bore 7 into which seats the valve body 8 provided with a valve passage 9 connecting the gas flow pipes 10 and 11. The valve body 8 is retained in position within the sleeve 5 through the medium of the collar 12 secured to its lower end beyond the valve sleeve 5.

The upper end of the valve body 8 is recessed as at 13 at its opposite side to provide seats, the purpose of which will be hereinafter described. The upper end of the valve body 8 is also provided with a bore in which is journalled the pivot stud 14 which is formed integrally with a handle 15, the intermediate portion 16 being undercut as at 17 diametrically of the portion 16 to provide a locking device to prevent accidental turning on of the gas, when the same has been turned off.

The pivot stud 14 is concentric with the handle 15 and the extended portion thereof beyond the valve body 8 is encircled by a torsion spring 18 whose normal tendency is to revolve the stud 14 and handle 15 so that the undercut portion 17 will normally assume a vertical position or a position, as illustrated in Figure 4, so that when the handle is swung to shut off the gas and the portion 17 overrides the edge of the arcuate extension 6 of the valve sleeve 5, the handle will be revolved 90 degrees by the spring 18 and the surface 17 will abut the edge 20 of the extension 6. In this position, the handle will be locked or latched so that the gas cannot be turned on accidentally and in order to turn the gas on, it will be necessary for the operator to revolve the handle against the action of the spring 18 until the undercut surface 17 is horizontal at which time the surface may be slid along the top of the extension 6 and the gas turned on. The revolving movement of the valve is controlled by the stop pin 21 which limits the movement of the valve body in one direction by coming into contact with the edge of the extension 6 and in the other direction by coming into contact with the dowel 22 secured in the sleeve 5.

One end of the spring 18 is secured to the valve body 8 while the other end is secured in a suitable opening in the end of the handle pivot 14.

It is evident that when the handle is moved so that the undercut portion 17 thereof slides along the top of the extension 6, that the gas will gradually be turned off because the bore 9 will be revolved so that it is out of alignment with the pipes 10 and 11 and it is evident that when more than half of the undercut surface 17 extends over the edge of the extension 6, the action of the spring will be such that it will snap the handle down so that the undercut surface 17 assumes a vertical position and automatically locks the handle in the position illustrated in Figure 3 in which it cannot be accidentally moved to turn on the gas.

It is evident, therefore that I have provided a unique locking device in connection with a gas cock or valve which can be manufactured at small cost and which can be incorporated in standard constructions at present in use.

It is evident, also, that I have provided a safety gas cock which prevents accidental turning on of the gas and prevents tampering by children with the handle of the valve to accidentally turn on the gas.

The undercut portion 13 of the body of the valve provides for the free rotating movement of the handle portion 16.

My invention is not to be restricted to the precise details of construction shown since various changes and modifications may be made therein without departing from the scope of the invention or sacrificing the advantages derived from its use.

I claim:

1. A safety gas valve comprising a valve housing, a valve body rotatable therein, a handle for turning the valve body having an undercut portion, a projection on the housing, and means for automatically revolving said handle when it rides over said projection whereby the undercut portion abuts said projection.

2. A safety gas valve comprising a valve housing, a valve body rotatable therein, a handle for turning the valve body having an undercut portion thereon, a projection on the housing, and a spring for automatically revolving said handle when it rides over said projection whereby the undercut portion abuts the projection to latch the handle in gas cut off position.

3. In a device of the character described, a valve housing having an extended portion constituting a slide seat, a handle undercut to provide a latch face rideable over said seat, and means for revolving the handle to permit said latch face to abut one end of said seat.

4. In a device of the character described, a valve housing having an extended portion constituting a slide seat, a valve body, a handle in the body undercut to provide a latch face rideable over said seat, a spring for revolving the handle to permit said latch face after it rides off said seat to abut one end of the seat, and means for limiting the movement of said valve body.

Signed at Elmhurst, in the county of Queens and State of New York, this 2nd day of July, A. D. 1930.

HERMAN A. ANDERSON. [L. S.]